United States Patent
Celik et al.

(10) Patent No.: US 11,168,934 B2
(45) Date of Patent: Nov. 9, 2021

(54) EXTRUDED PLASTIC FRONT FRAME PROFILES FOR COOLING APPLIANCES

(71) Applicants: BSH Home Appliances Corporation, Irvine, CA (US); BSH Hausgeräte GmbH, Munich (DE)

(72) Inventors: Cetin Abdullah Celik, Knoxville, TN (US); Alexander Görz, Aalen (DE); Samuel Harward, Knoxville, TN (US); Cemalettin Hasturk, Knoxville, TN (US)

(73) Assignees: BSH Home Appliances Corporation, Irvine, CA (US); BSH Hausgeräte GmbH, Munich (DE)

(*) Notice: Subject to any disclaimer, the term of this patent is extended or adjusted under 35 U.S.C. 154(b) by 8 days.

(21) Appl. No.: 16/750,021

(22) Filed: Jan. 23, 2020

(65) Prior Publication Data

US 2021/0231361 A1    Jul. 29, 2021

(51) Int. Cl.
| | | |
|---|---|---|
| *F25D 23/06* | (2006.01) | |
| *F25D 21/04* | (2006.01) | |
| *F25D 23/08* | (2006.01) | |
| *B29C 48/00* | (2019.01) | |
| *B29D 12/00* | (2006.01) | |
| *B29C 48/16* | (2019.01) | |

(52) U.S. Cl.
CPC .......... *F25D 21/04* (2013.01); *F25D 23/082* (2013.01); *B29C 48/022* (2019.02); *B29C 48/16* (2019.02); *B29D 12/00* (2013.01); *F25D 23/066* (2013.01); *F25D 2323/021* (2013.01)

(58) Field of Classification Search
CPC ................ F25D 23/082; F25D 23/066; F25D 2323/021; B29D 12/00; B29C 48/16
USPC ............................................... 312/406, 406.2
See application file for complete search history.

(56) References Cited

U.S. PATENT DOCUMENTS

| | | | |
|---|---|---|---|
| 3,055,193 A | 9/1962 | Smith | |
| 3,077,644 A | 2/1963 | Kesling | |
| 3,248,159 A | 4/1966 | Hall | |
| 3,338,451 A * | 8/1967 | Kesling ................ | F25D 23/082 |
| | | | 220/592.08 |
| 3,378,957 A | 4/1968 | Frehse et al. | |
| 3,631,644 A * | 1/1972 | Mazza .................. | F25D 23/082 |
| | | | 312/406 |
| 3,835,660 A * | 9/1974 | Franck .................... | F25D 21/04 |
| | | | 62/277 |
| 4,150,518 A * | 4/1979 | Truesdell ................ | F25D 21/04 |
| | | | 220/592.08 |
| 4,330,310 A * | 5/1982 | Tate, Jr. .................. | F25D 21/04 |
| | | | 312/407 |
| 4,732,432 A * | 3/1988 | Keil ...................... | F25D 23/082 |
| | | | 220/592.06 |

(Continued)

*Primary Examiner* — Daniel J Troy
*Assistant Examiner* — Timothy M Ayres
(74) *Attorney, Agent, or Firm* — Michael E. Tschupp; Andre Pallapies; Brandon G. Braun

(57) ABSTRACT

A refrigerator front frame for a refrigerator appliance, includes: four extruded plastic profiles; four corner connecting pieces configured to join the four extruded plastic profiles to form the refrigerator front frame, wherein a co-extruded, thin metal strip is embedded within a wall of each of the four extruded plastic profiles so as to be near an outer surface of a corresponding extruded plastic profile as compared to an overall wall thickness of the corresponding extruded plastic profile.

15 Claims, 8 Drawing Sheets

(56) References Cited

U.S. PATENT DOCUMENTS

| | | | |
|---|---|---|---|
| 4,834,471 A | | 5/1989 | Pasqualini |
| 5,129,184 A | | 7/1992 | Fish |
| 5,368,381 A | * | 11/1994 | Mandel ................ F25D 23/062 |
| | | | 312/406.2 |
| 5,638,694 A | * | 6/1997 | Banicevic ............ F25D 21/04 |
| | | | 62/277 |
| 5,720,536 A | * | 2/1998 | Jenkins ................ F25D 23/085 |
| | | | 312/401 |
| 6,464,312 B1 | | 10/2002 | Tenhundfeld et al. |
| 6,655,766 B2 | * | 12/2003 | Hodges ................ F25D 23/085 |
| | | | 312/406.2 |
| 7,293,847 B2 | * | 11/2007 | Lee ........................ F25D 21/04 |
| | | | 312/401 |
| 7,914,094 B2 | * | 3/2011 | Wood ................... F25D 25/025 |
| | | | 312/402 |
| 8,621,877 B2 | | 1/2014 | Tuszkiewicz et al. |
| 8,752,921 B2 | | 6/2014 | Görz et al. |
| 9,157,676 B2 | * | 10/2015 | Lee ..................... F16J 15/3224 |
| 9,243,835 B2 | * | 1/2016 | Jeon ....................... F25D 21/04 |
| 9,810,477 B2 | | 11/2017 | Sul et al. |
| 9,885,202 B2 | | 2/2018 | Laible |
| 2003/0041612 A1 | * | 3/2003 | Piloni ................... F25D 23/062 |
| | | | 62/277 |
| 2016/0348957 A1 | * | 12/2016 | Hitzelberger ............ F25D 23/02 |
| 2018/0180350 A1 | | 6/2018 | Yoon et al. |
| 2019/0162465 A1 | | 5/2019 | Allard et al. |

* cited by examiner

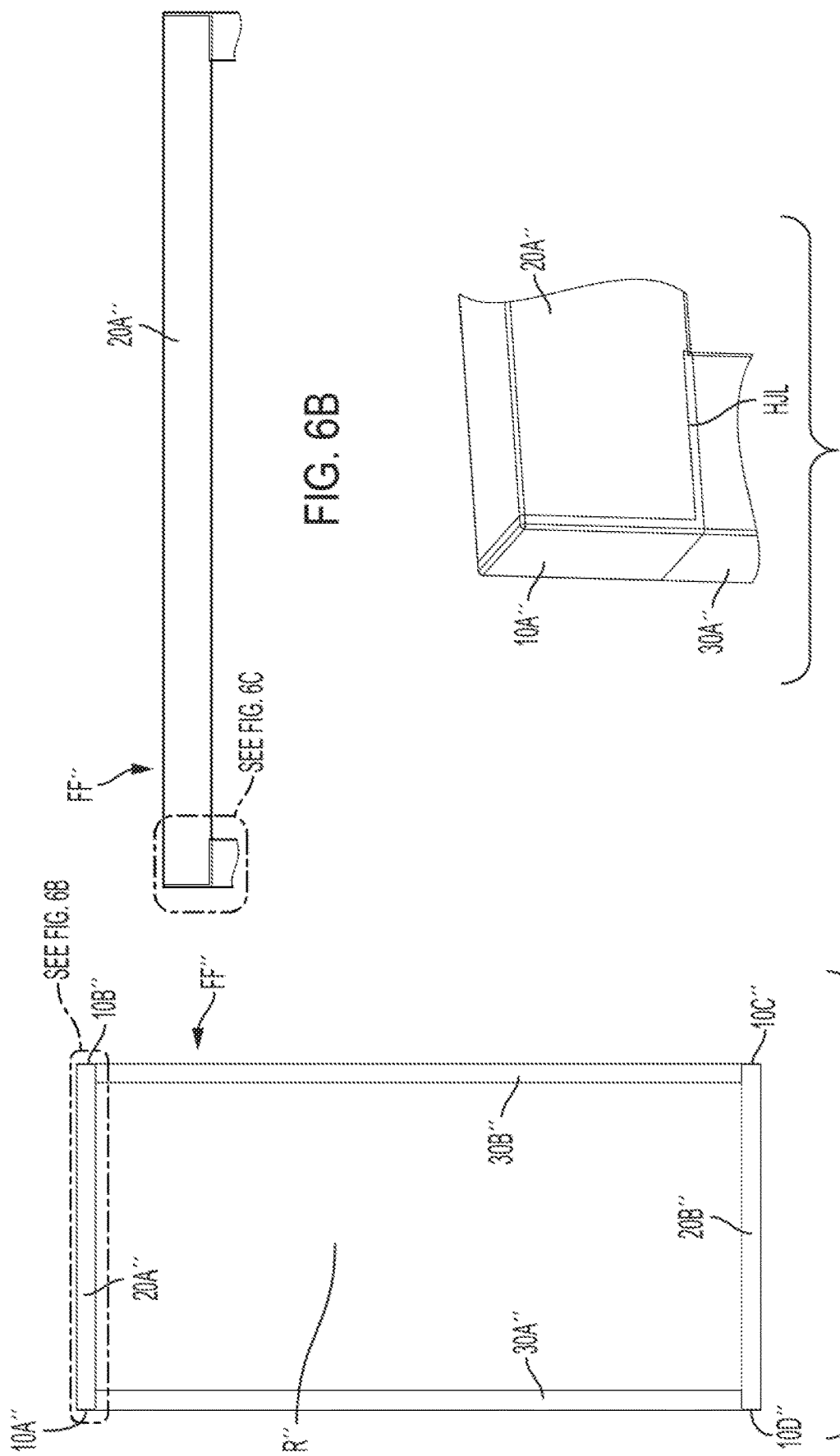

EXTRUDED PLASTIC FRONT FRAME PROFILES FOR COOLING APPLIANCES

FIELD OF THE INVENTION

The present disclosure relates generally to cooling appliances and to front frames for cooling appliances. More particularly, the present disclosure relates to extruded plastic front frame profiles for a refrigerator appliance.

BACKGROUND OF THE INVENTION

In general, the front frame on traditional free standing refrigerators is often formed by wrapping the edges of the housing sides, top, and bottom over a thermoformed inner liner. This operation requires expensive and space intensive thermoforming equipment in the manufacturing facility. This method also limits the front frame color to the existing color of the inner liner and housing of the refrigerator. This solution also leaves an unappealing and unsightly seam that is visible when the door of the refrigerator appliance is opened.

While some built-in refrigerators have a front frame that is seamless by using a thermoformed one-piece frame, this solution creates a problem in that a heater for condensation prevention must be disposed up against the thermoformed plastic which in turn presents a risk of thermal aging, deformation, and discoloration of the thermoformed one-piece frame. Also, the thick plastic material of this type of thermoformed one-piece frame requires the use of a counter magnet to help draw in the door seal of the refrigerator door through the thick cross section of the front frame. Some of the built-in refrigerators have a thermoformed front frame that is one piece and is separate from the inner liner. An expensive protective foil for this type of front frame is required during transit.

SUMMARY OF THE INVENTION

One aspect of the present invention is to eliminate the need for: expensive and space intensive thermoforming tooling; a bulky door seal magnet in the front frame; expensive polarized counter-draw magnets in the refrigerator door gaskets; and using a protective foil to protect the front frame during transit.

Another aspect of the present invention is to eliminate the material scrap which results from the center cut-out of a one-piece frame which in turn benefits the environment.

Another aspect of the present invention is to allow direct coloring of the front frame plastic without the need for additional painting steps to achieve a high quality color and surface finish.

Another aspect of the present invention is to provide a unique aesthetic by providing a smooth face, few gaps/seams, and multiple color variants.

Another aspect of the present invention is to provide proper insulation and heat distribution to eliminate condensation on the front frame of the refrigerator.

Another aspect of the present invention is to improve the durability of the front frame of the refrigerator by: using acrylonitrile butadiene styrene (ABS) plastic as a core plastic part and co-extruding a protective polymethylmethacrylate (PMMA) layer over the core plastic part. The PMMA layer serves to: eliminate plastic erosion due to contact with skin oils/acids, protect against transit damage, and protect against, e.g., ultraviolet (UV) radiation. Alternatively, an acrylonitrile styrene acrylate (ASA) plastic can be used, which is more UV resistant than ABS plastic.

Another aspect of the present invention is to provide a method of forming an extruded plastic profile of a refrigerator front frame for a refrigerator appliance.

Another aspect of the present invention is to ensure reliable sealing between the front frame and the outer cabinet, as well as between the front frame and the inner liner of the refrigerator.

An apparatus consistent with the present disclosure is directed to a refrigerator front frame for a refrigerator appliance, including: four extruded plastic profiles; four corner connecting pieces configured to join the four extruded plastic profiles to form the refrigerator front frame, wherein a co-extruded, thin metal strip is embedded within a wall of each of the four extruded plastic profiles so as to be near an outer surface of a corresponding extruded plastic profile as compared to an overall wall thickness of the corresponding extruded plastic profile.

According to one aspect, the thin metal strip has a thickness in a range of 0.4 mm to 1.0 mm.

According to another aspect, the thin metal strip has a thickness of 0.5 mm.

According to another aspect, the thin metal strip is spaced apart from the outer surface of the corresponding extruded plastic profile a distance in a range of 0.5 mm to 1.0 mm.

According to another aspect, the thin metal strip is spaced apart from the outer surface of the corresponding extruded plastic profile a distance of 0.75 mm.

According to another aspect, each of the four extruded plastic profiles comprises acrylonitrile butadiene styrene (ABS) plastic as a core plastic part and a co-extruded protective polymethylmethacrylate (PMMA) layer over the core plastic part.

According to another aspect, each of the four extruded plastic profiles comprises an acrylonitrile styrene acrylate (ASA) plastic as a plastic part.

According to another aspect, each of the four corner connecting pieces is an injection molded plastic part.

According to another aspect, a heating tube for distributing anti-condensation heat is disposed against a rear side of the thin metal strip on a back side of the corresponding extruded plastic profile.

According to another aspect, the heating tube is retained by a clip and opposing extruded features that project from the wall and have hooks which hold the clip in place.

According to another aspect, the present disclosure provides a method of forming each of the four extruded plastic profiles of the refrigerator front frame for a refrigerator appliance, comprising the step of: co-extruding an acrylonitrile butadiene styrene (ABS) plastic as a core plastic part and a protective polymethylmethacrylate (PMMA) layer over the core plastic part.

According to another aspect, the present disclosure provides a method of forming each of the four extruded plastic profiles of the refrigerator front frame for a refrigerator appliance, comprising the step of: extruding an acrylonitrile styrene acrylate (ASA) plastic as a plastic part.

According to another aspect, the refrigerator front frame having the four extruded plastic profiles and the four corner connecting pieces forms a front frame of a French door bottom mount (FDBM) refrigerator appliance or other cooling appliance such as an under counter appliance with drawers or doors or a single door refrigerator or freezer or wine cooler appliance.

According to another aspect, a plurality of the refrigerator front frames is provided with each having the four extruded plastic profiles and the four corner connecting pieces and each forming a corresponding front frame of one of multiple adjacent cooling appliances which are intended to be purchased and installed as a group at the customer's location.

According to another aspect, the multiple adjacent cooling appliances include a French door bottom mount (FDBM) refrigerator appliance in a middle position, and a freezer column appliance on one side and a wine cooler appliance on the other side of the FDBM refrigerator appliance.

According to another aspect, each of the four extruded plastic profiles is extruded in color and has a uniform, consistent appearance.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 6A-6C are various views of a complete refrigerator front frame having hidden corner connecting pieces and horizontal seams or joining lines for a refrigerator appliance according to another exemplary embodiment consistent with present disclosure;

Figure 8A:
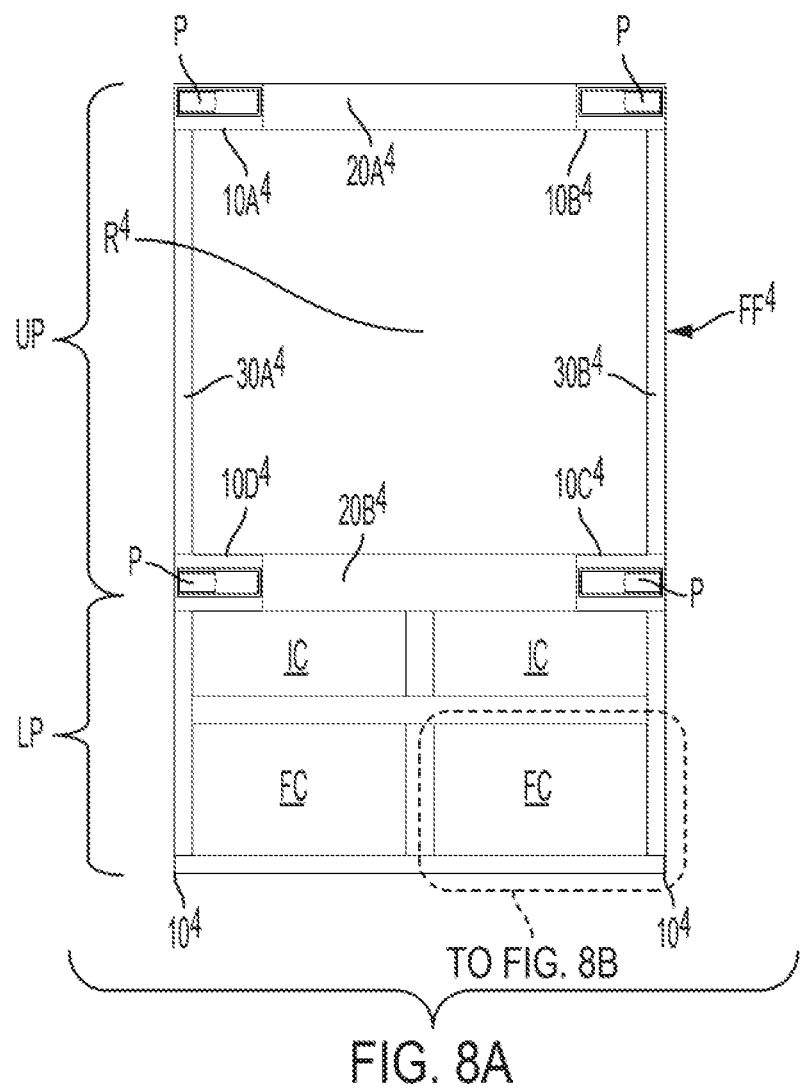
Figure 8B:
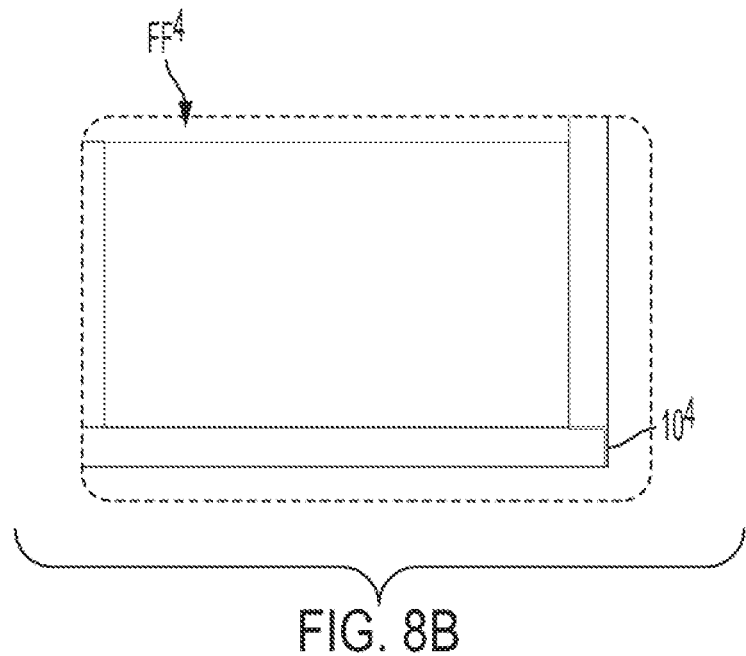
Figure 9:
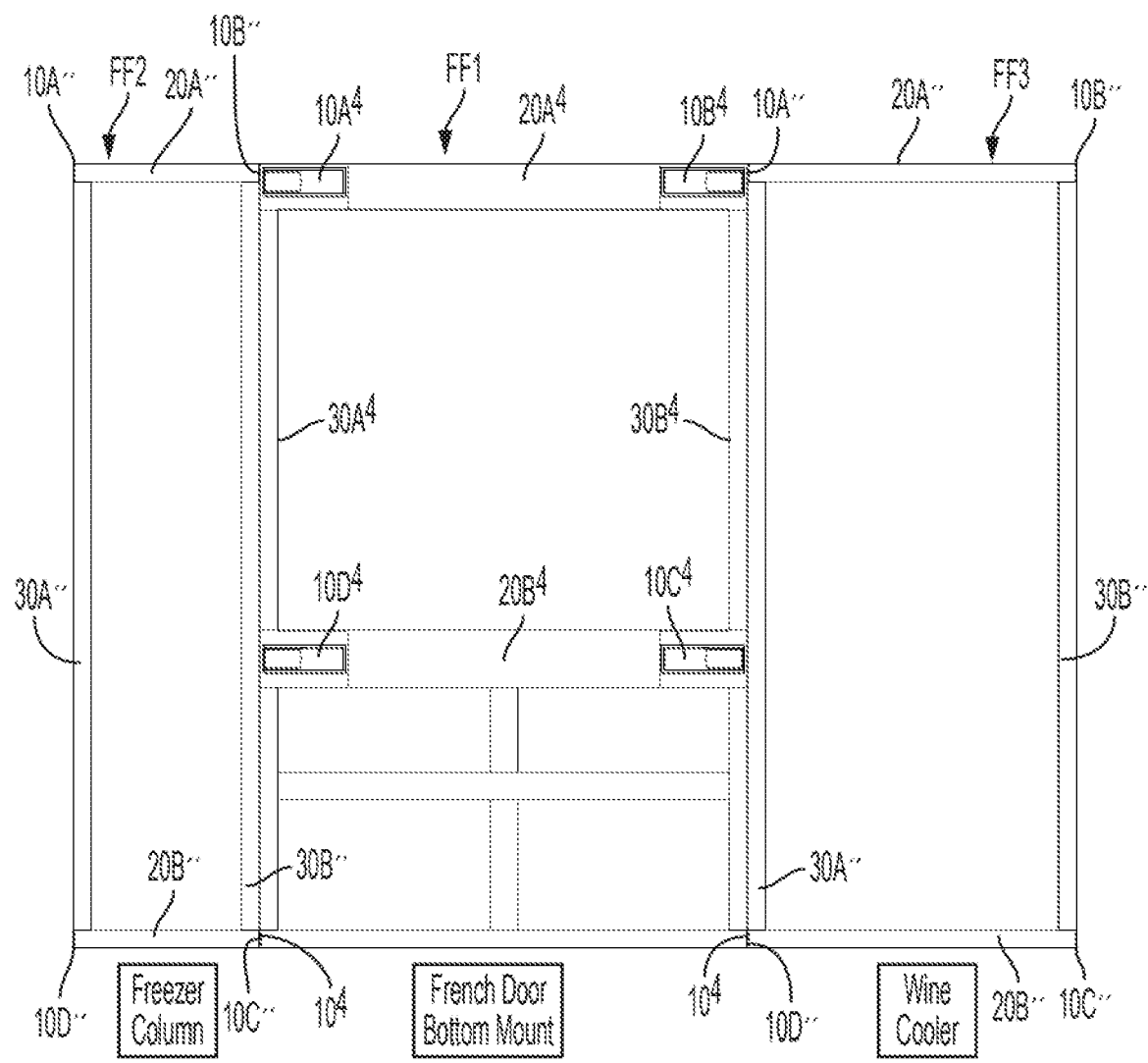

FIG. 8A is a front view of a refrigerator front frame for a French door bottom mount (FDBM) refrigerator appliance, and FIG. 8B is an enlarged view of a lower right hand corner portion of the refrigerator front frame of FIG. 8A according to another exemplary embodiment consistent with present disclosure; and FIG. 9 is a front view of multiple adjacent cooling appliances utilizing the hidden corner injection molded connecting pieces and horizontal and vertical extruded profiles according to an exemplary embodiment consistent with present disclosure.

DETAILED DESCRIPTION OF THE EXEMPLARY EMBODIMENTS

The exemplary embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Moreover, it should be understood that terms such as top, bottom, front, rear, middle, upper, lower, right side, left side, vertical, horizontal, downward, upward, and the like used herein are for orientation purposes with respect to the drawings when describing the exemplary embodiments and should not limit the present invention unless explicitly indicated otherwise in the claims. Also, terms such as substantially, approximately, and about are intended to allow for variances to account for manufacturing tolerances, measurement tolerances, or variations from ideal values that would be accepted by those skilled in the art.

The present application is related to application Ser. No. 16/750,022, entitled "INJECTION MOLDED FRONT FRAME CORNERS FOR COOLING APPLIANCES," filed on an even date herewith, and the entire contents of which are incorporated herein by reference.

Figure 1:
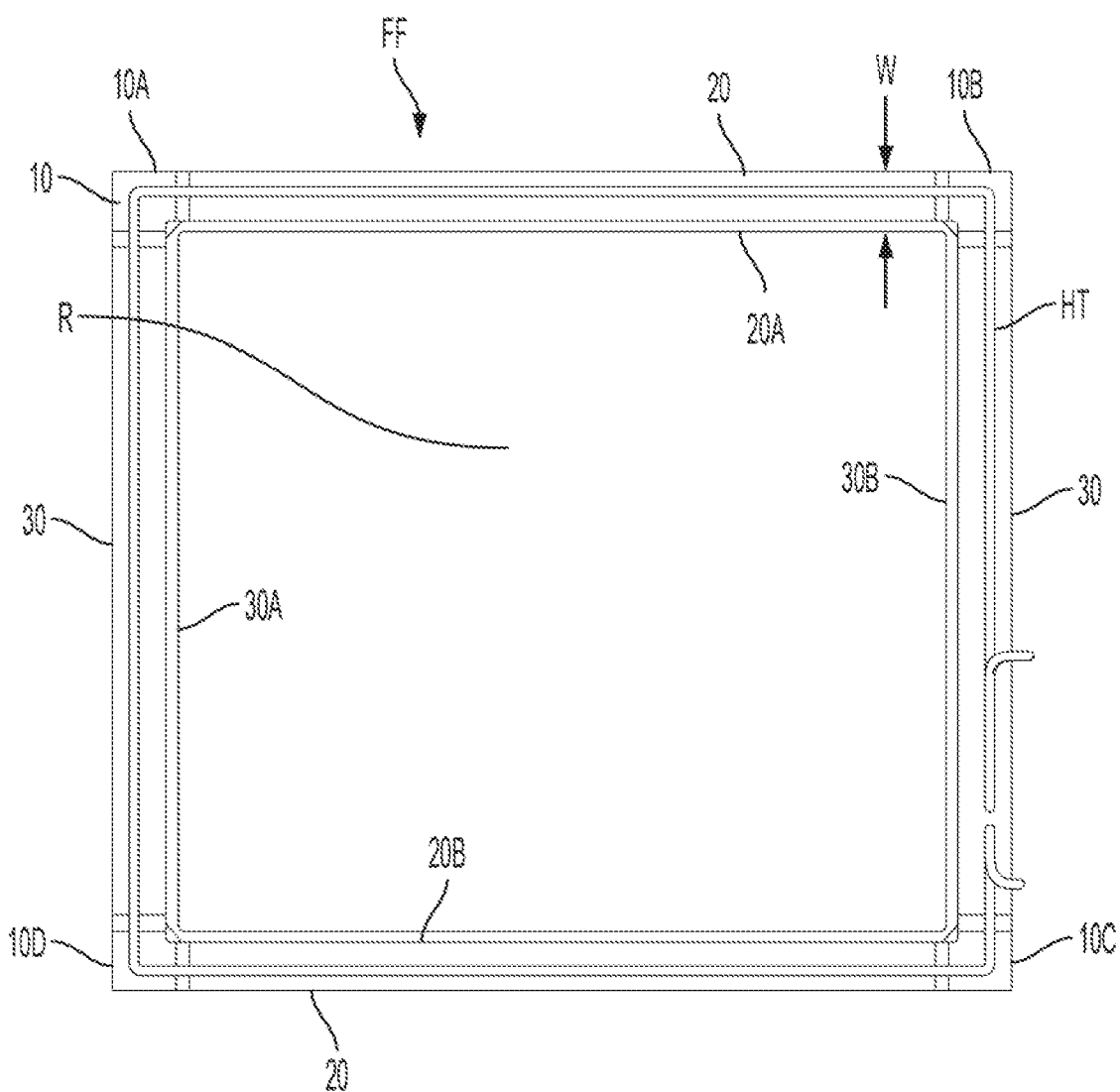
FIG. 1 is a rear view of a complete refrigerator front frame having extruded plastic profiles and injection molded plastic corner connecting pieces according to an exemplary embodiment consistent with present disclosure.
Figure 7A:
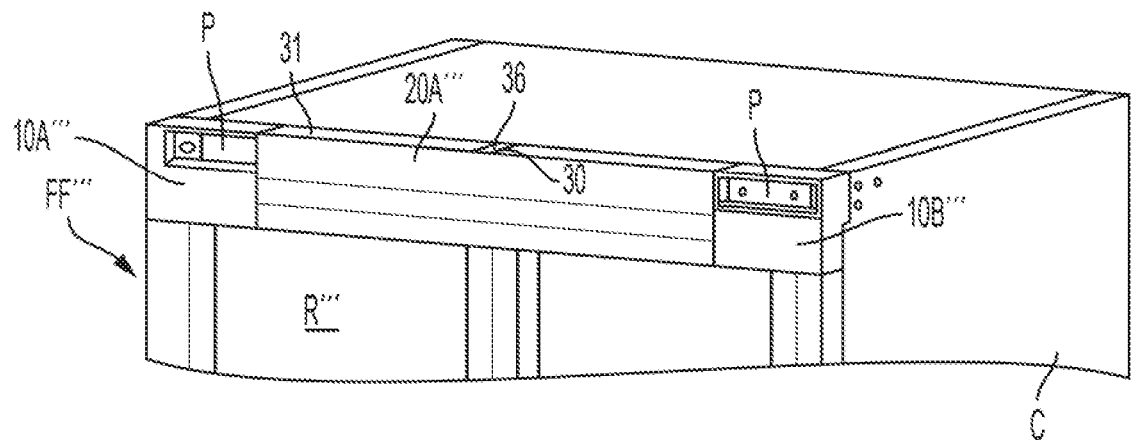
FIGS. 7A and 7B are front and rear perspective views, respectively, of a refrigerator front frame on a refrigerator/cooling appliance showing an access opening and compartment for a door reed switch and a reed switch holder according to an exemplary embodiment consistent with present disclosure.

FIG. 1 is a rear view of a complete refrigerator front frame FF for a refrigerator appliance R (also referred to as a front frame FF for a cooling appliance such as a refrigerator appliance R). The refrigerator front frame FF includes injection molded plastic corner connecting pieces 10 (also sometimes referred to as corner connecting pieces) connecting horizontal extruded plastic profiles 20 and vertical extruded plastic profiles 30 (also sometimes referred to as extruded profiles) according to an exemplary embodiment consistent with present disclosure. In particular, four extruded plastic profiles, including two horizontal extruded plastic profiles 20A and 20B and two vertical extruded plastic profiles 30A and 30B, are connected together by four injection molded plastic corner connecting pieces 10A, 10B, 10C, and 10D in order to join the four extruded plastic profiles 20A, 20B; 30A, 30B to form the refrigerator front frame FF. The front frame FF is typically attached to a front side end portion of a structural casing or housing of the refrigerator appliance R (note that FIG. 7A shows the casing C of the refrigerator appliance). Also visible in FIG. 1 is a heating tube HT for distributing non-condensation heat which will be described in more detail below.

Figure 2:
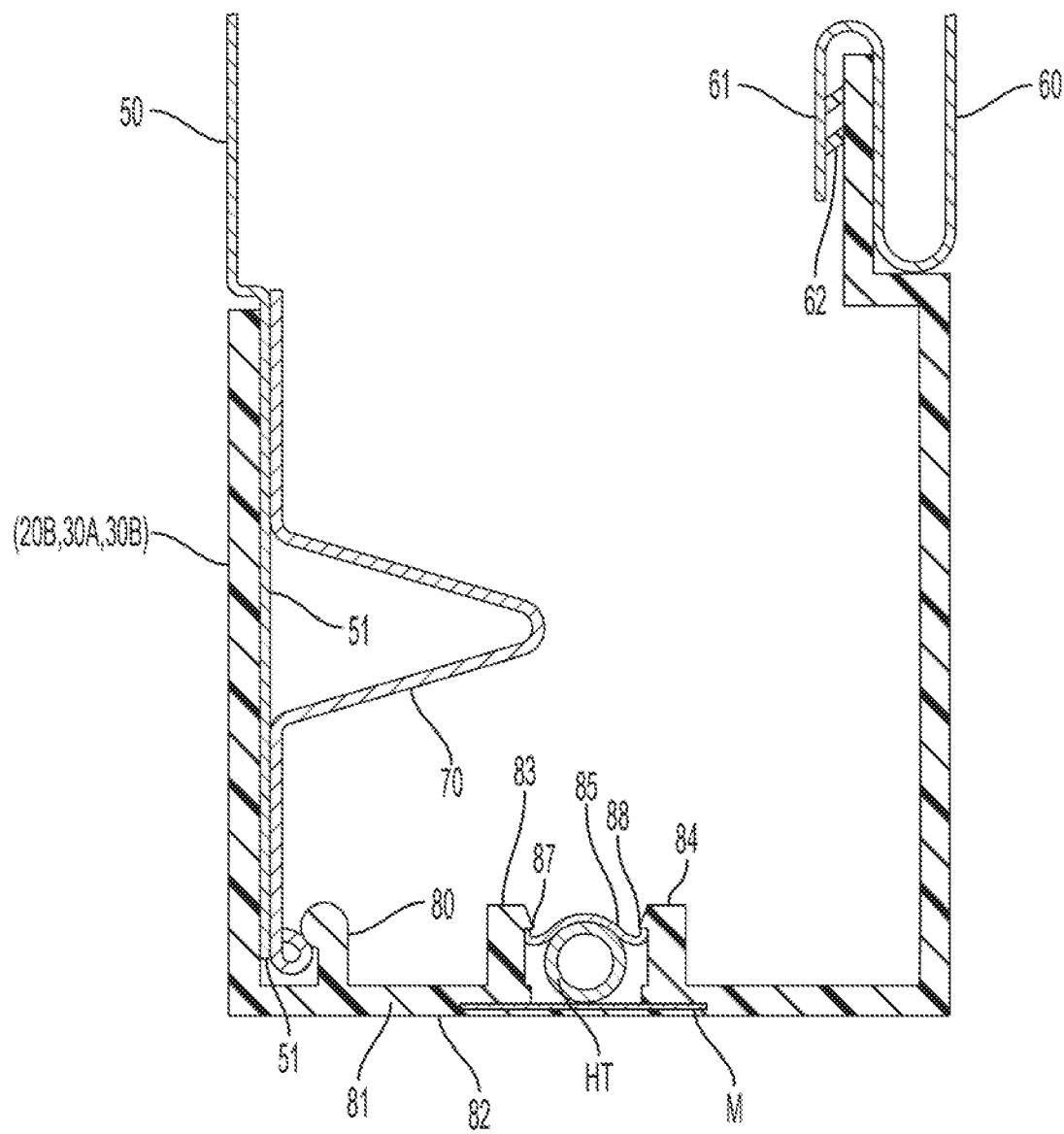
FIG. 2 is a sectional view through a single extruded profile that would serve as either one of the sides or the bottom, but not the top, of the refrigerator front frame according to an exemplary embodiment consistent with present disclosure.

FIG. 2 is a sectional view through a single extruded plastic profile 20, 30 that would serve as either one of the sides 30A, 30B or the bottom 20B profile, but not the top profile 20A, of the refrigerator front frame FF according to an exemplary embodiment consistent with present disclosure. The top profile 20A is normally wider in width W (see FIG. 1) than the two sides 30A, 30B and the bottom 20B profiles in order to house a door reed switch and reed switch holder, as well as other serviceable components, as will be discussed below in connection with FIGS. 7A and 7B.

As shown in FIG. 2, the single extruded plastic profile 20B, 30A, or 30B of the refrigerator front frame FF is illustrated as representative. The extruded plastic profile 20B, 30A, or 30B is attached to one of the sides or bottom of an outer housing 50 and an inner liner 60 of the refrigerator appliance R. The outer housing 50 is typically formed of galvanized sheet metal and the inner liner 60 is typically formed of premium sheet metal (such as aluminum, stainless steel, etc.), but neither is limited to these materials. The extruded plastic profile 20B, 30A, or 30B is disposed over a leading end portion 51 of the outer housing 50 and a reinforcement part 70 formed of, for example, sheet metal, is installed on the inside of the leading end portion 51 of the outer housing 50 and substantially within the extruded plastic profile 20B, 30A, or 30B of the refrigerator front frame FF. The reinforcement part 70 provides increased rigidity in the extruded plastic profile 20B, 30A, or 30B. An extruded engagement member or pawl 80 may be included on an inner part of the wall 81 of the extruded plastic profile 20B, 30A, or 30B to retain the reinforcement part 70 at its lower end. The inner liner 60 includes a bent leading edge portion 61 that engages with extruded flexible sealing lips or blades 62 for sealing-in an insulating foam that is injected into the front frame FF and between the inner liner 60 and outer housing 50 of the refrigerator appliance R. Similar type sealing projections or ribs can also be disposed on or formed as part of the extruded plastic profile inner wall to engage with the leading end portion 51 of the outer housing 50.

As best shown in FIG. 2, a co-extruded, thin metal strip M is embedded within the wall 81 of the extruded plastic profile so as to be near an outer surface 82 of the extruded plastic profile as compared to an overall wall thickness of the extruded plastic profile. In this case, each of the four extruded plastic profiles 20, 30 includes the co-extruded, thin metal strip M is embedded within the wall 81 thereof. By positioning the thin metal strip M near the outer surface 82 of the extruded plastic profiles, the thin metal strip M serves to draw a magnetic door seal in a door (not shown) of the cooling appliance/refrigerator R. The metal strip M can be set closer to the outer surface 82 with extrusion profiles than with typical means of front frame construction (thermoforming for example). This eliminates the need for an expensive "counter-magnet" in the front frame to draw the door seal, and allows the use of less expensive door seals without polarized counter-draw magnets. The thin metal strip M preferably has a thickness in a range of 0.4 mm to 1.0 mm, and more preferably has a thickness of 0.5 mm. The thin metal strip M is preferably spaced apart from the outer surface 82 of the corresponding extruded profile 20, 30 a distance in a range of 0.5 mm to 1.0 mm, and more preferably is spaced apart from the outer surface 82 of the corresponding extruded profile 20, 30 a distance of 0.75 mm. The thin metal strip M also ensures good heat distribution from the heating tube HT which is clipped into the back of the front frame FF. The heating tube HT for distributing anti-condensation heat at the refrigerator front frame FF is disposed against a rear side of the thin metal strip M on a back side or inner part of the wall 81 of the corresponding extruded profile 20, 30. The heating tube HT is retained by, for example, opposing extruded features 83 and 84 that project from the wall 81 and which hold a clip 85 (for example, formed of metal) that is held in place by hooks 87 and 88 on the opposing extruded features 83 and 84, respectively. In use, refrigerant with excess heat from the cooling cycle, for example, is passed through the heating tube HT to prevent condensation from forming at the front surface of the front frame FF.

Figure 3:
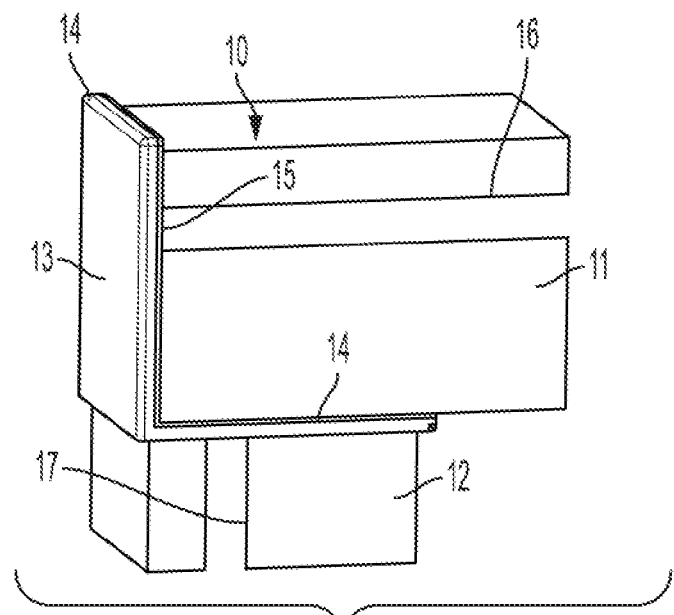
FIG. 3 is a perspective view showing a single corner connecting piece separately according to an exemplary embodiment consistent with present disclosure.

With reference to FIG. 3, an individual corner connecting piece 10 is shown and comprises a horizontal receiving portion 11 configured to receive one of the horizontal extruded profiles 20 thereover and a vertical receiving portion 12 configured to receive one of the vertical extruded profiles 30 thereover. The horizontal receiving portion 11 of the corner connecting piece 10 includes an exposed end face 13 with a flange 14 that extends beyond the horizontal receiving portion 11 and serves as a stop 15 for the end 21 (see FIG. 4) of a corresponding horizontal extruded profile 20. The horizontal receiving portion 11 of the corner connecting piece 10 includes an elongated slot 16 configured to slidably receive a corresponding rail 22 that projects from a rear surface 23 of a corresponding horizontal extruded profile 20. The vertical receiving portion 12 of the corner connecting piece 10 includes an elongated slot 17 configured to slidably receive a corresponding rail (not shown but similar to rail 22) that projects from a rear surface of a corresponding vertical extruded profile 30. The individual injection molded plastic corner connecting pieces 10 are preferably, but not necessarily, formed from acrylonitrile styrene acrylate (ASA) plastic.

Figure 4:
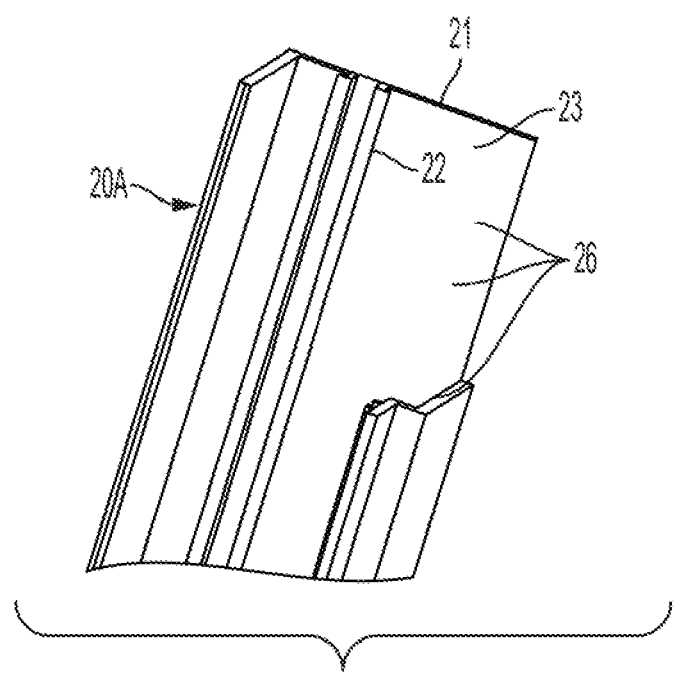
FIG. 4 is a fragmentary, rear perspective view showing a machining detail of a single profile according to an exemplary embodiment consistent with present disclosure.

As best shown in FIG. 4, the side of one extruded profile 20, 30 must be machined out before assembly in order to clear where the other attaches to the corner connecting piece 10. For example, a lower side of the top horizontal profile 20A is machined as at 26 to cut away a wall portion such that the top horizontal profile 20A is slidable over the vertical receiving portion 12 of a corresponding one of the four corner connecting pieces 10. This would also then be the case at an upper side of the bottom horizontal profile 20B which would need to be machined in order to clear where the vertical profiles 30A and 30B attach to the corner connecting pieces 10.

A preferred method of forming each of the extruded plastic profiles of the refrigerator front frame FF for a refrigerator appliance R consistent with the present invention comprises the step of co-extruding an acrylonitrile butadiene styrene (ABS) plastic as a core plastic part and a protective polymethylmethacrylate (PMMA) layer over the core plastic part. Using the (PMMA) layer over the core plastic part serves to: eliminate plastic erosion due to contact with skin oils/acids, protect against transit damage such as scratching, and protect against, e.g., ultraviolet (UV) radiation. Such an extruded plastic profile improves the durability of the front frame FF of the refrigerator appliance R.

Alternatively, each of the four extruded plastic profiles is formed by extruding an acrylonitrile styrene acrylate (ASA) plastic which is more UV resistant than ABS plastic.

An all-plastic construction allows for simpler color variants than if metal wrapped over from adjacent panels is made part, or all, of the front frame FF. This also eliminates an unsightly seam which is present on most free-standing refrigeration products. Other forming technologies (such as thermoforming) require larger minimum corner radii and have less consistent surface finish, which is undesirable cosmetically. Other technologies (such as injection molding) may present visible "weld lines" and/or color inconsistencies on the front surface, so they require additional painting processes in order to offer attractive appliances in various colors. Front frames FF with extruded plastic profiles 20, 30 according to the present disclosure can be extruded in color and have a uniform, consistent appearance as formed.

In both extrusion methods, the thin metal strip M is co-extruded into the plastic material(s) such that thin metal strip M is embedded within the wall 81 of each of the four extruded plastic profiles so as to be near the outer surface 82 of a corresponding extruded plastic profile as compared to an overall wall thickness of the corresponding extruded plastic profile, as noted above with respect to FIG. 2. Alternatively, a thin metal strip M can be slid into a channel in the plastic extrusion as a secondary assembly step.

Figure 5:
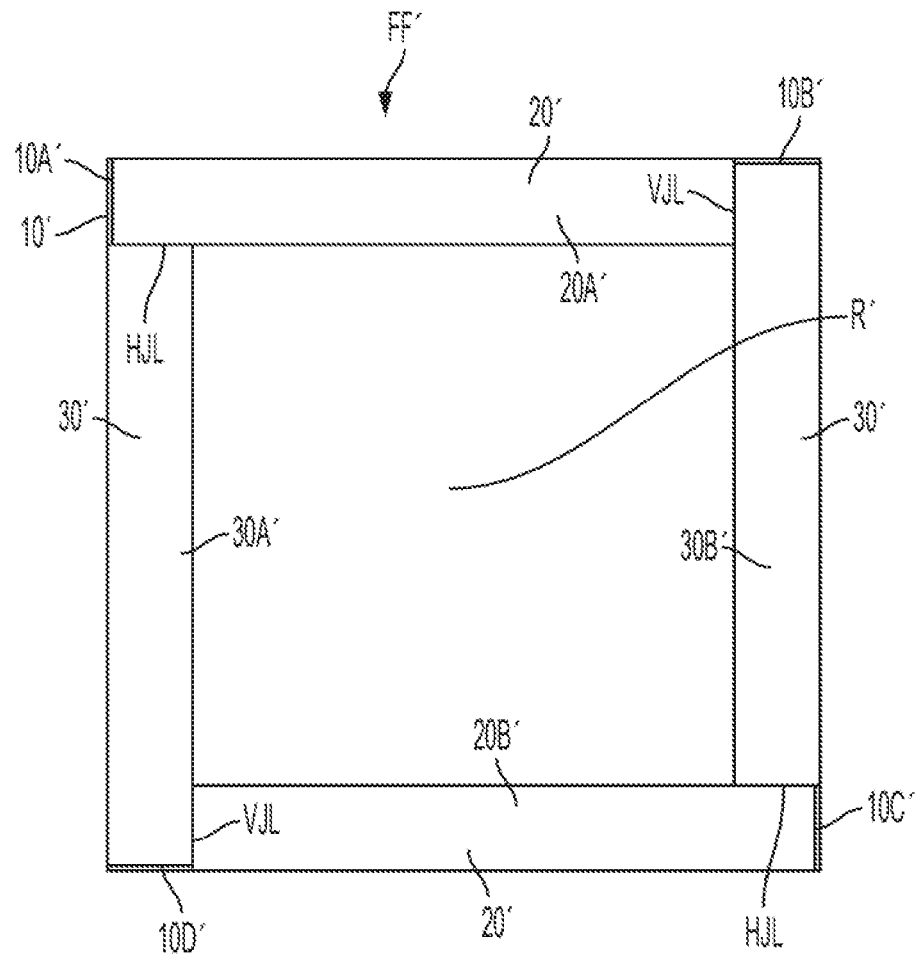
FIG. 5 is a front view of a complete refrigerator front frame having hidden corner connecting pieces and a mix of horizontal and vertical seams or joining lines according to an exemplary embodiment consistent with present disclosure.

As shown in FIG. 5, a complete refrigerator front frame FF' is provided having four hidden corner connecting pieces 10A', 10B', 10C', and 10D' and a mix of horizontal seams or joining lines HJL and vertical seams or joining lines VJL where the horizontal extruded profiles 20A', 20B' and vertical extruded profiles 30A', 30B' are joined together at the corners according to an exemplary embodiment consistent with present disclosure. Similar reference numbers are used to denote similar structure as in FIG. 1, except that a single prime sign (') is added next to the reference numeral. This embodiment of mixed horizontal and vertical seams or joining lines is achieved by using the same injection molded corner connecting piece 10' at every corner. A cooling or refrigerator appliance R' having a refrigerator front frame FF' where all four corner connecting pieces 10A'-10D' would be ones that have no hinges such as, but not limited to, an under-the-counter drawer type appliances.

By using the corner connecting pieces 10, 10', etc., consistent with the present disclosure as described above and hereinafter, a corner piece, which is mostly hidden behind the extruded profiles 20, 20'; 30, 30', etc., can be created. This creates a sleeker, slimmer appearance with gaps less visible. The corner connecting pieces 10, 10' and extruded profiles 20, 20'; 30, 30' are held relative to each other by the injected insulation foam in the cooling appliance R, R', etc., but can also be fixed by other means such as sonic welding, posting, gluing, screwing, taping, riveting, etc., for additional strength.

Moreover, by using the corner connecting pieces 10, 10', etc., consistent with the present disclosure as described above and hereinafter, wider horizontal profiles 20A, 20A', etc., can be used at the top than at the sides. Wider top profiles 20A, 20A', etc., allow space for two chambers. As will be described in more detail below, the lower chamber is foam-filled like the rest of the extruded plastic profiles (sides and bottom), whereas the upper chamber is hollow and allows space for various serviceable components.

FIGS. 6A-6C are various views of a complete refrigerator front frame FF" having hidden corner connecting pieces 10" and horizontal seams or joining lines HJL for a refrigerator appliance R" according to another exemplary embodiment consistent with present disclosure. Similar reference numbers are used to denote similar structure as in FIG. 1, except that a double prime sign (") is added next to the reference numeral. In this embodiment, left and right mirror image variants of the corner connecting pieces 10" are used such that all of the seams or joining lines are oriented the same way—in this case horizontal joining lines HJL in FIGS. 6A-6C. Of course, all four of the seams or joining lines could be oriented vertically (FIG. 5 shows two of the seams as vertical joining lines VJL).

Figure 7B:
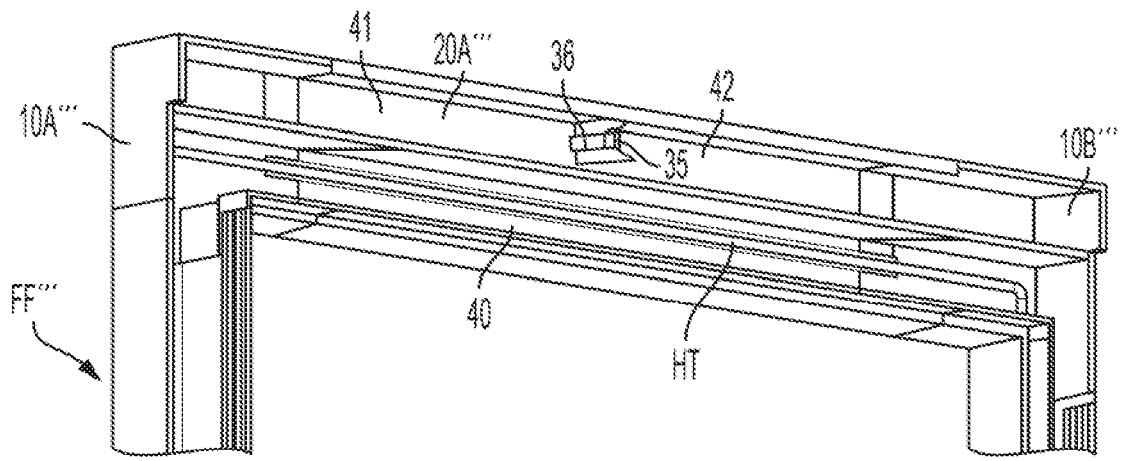

FIG. 7A is a front perspective view of a refrigerator front frame FF''' on a refrigerator/cooling appliance R''' showing an access opening 30 for a door reed switch 35 according to an exemplary embodiment consistent with present disclosure. Similar reference numbers are used to denote similar structure as in FIG. 1, except that a triple prime sign (''') is added next to the reference numeral. In particular, the top horizontal extruded profile 20A''' has the access opening 30 at the top edge or surface 31 for receiving a reed switch holder 36 (see the rear perspective view of FIG. 7B). In this way, the reed switch holder 36 can be removed and the door reed switch 35 serviced from the top edge 31 of the top horizontal extruded profile 20A''' of the refrigerator front frame FF''', so that no additional seams are necessary from a front view of the cooling appliance R'''. As shown in FIG. 7B, the top horizontal extruded profile 20A''' of the refrigerator front frame FF''' of the cooling appliance R''' is partitioned into a lower chamber 40 that is foam-filled, and an upper chamber 41 that is hollow. The lower chamber 40 accommodates the heating tube HT for distributing anti-condensation heat. The upper chamber 41 serves as a compartment 42 for the door reed switch 35. In addition to accommodating the door reed switch 35, the upper chamber 41 is also configured to accommodate one or more of the following serviceable components: door hinges, a wiring harness, an ambient light sensor, an open door assist, or other serviceable components. Note that in this embodiment, the two top corner connecting pieces 10A''' and 10B''' are not hidden but are revealed from the front because they also incorporate the function of a hinge pocket P for hinges for supporting doors (not shown).

FIG. 8A is a front view of a refrigerator front frame $FF^4$ for a French door bottom mount (FDBM) refrigerator appliance $R^4$ and FIG. 8B is an enlarged view of a lower right hand corner portion of the refrigerator front frame $FF^4$ of FIG. 8A according to another exemplary embodiment consistent with present disclosure. Similar reference numbers are used to denote similar structure as in FIG. 1, except that a superscript ($^4$) is added next to the reference numeral. In this embodiment, the upper and middle corner connecting pieces $10A^4$, $10B^4$, $10C^4$, and $10D^4$ are not hidden but are revealed from the front because they incorporate hinge pockets P in order to reduce the amount of parts. The hinge pockets P are for hinges (not shown) for supporting the two French doors (not shown) at an upper, main fresh food portion UP of the FDBM refrigerator appliance $R^4$. A lower portion LP of the FDBM refrigerator appliance $R^4$ is configured to house one or more freezer compartments FC at the bottom that can be either a single or multiple pullout drawer type sections and one or more intermediate compartments IC (such as, but not limited to, pullout drawers) that can be operated as either fresh food compartments or freezer compartments and which are located between the upper, main fresh food portion UP and the freezer compartments FC. FIG. 8B shows a lower right hand portion of the FDBM refrigerator appliance $R^4$ that uses a hidden corner connecting piece $10^4$. Both lower corner portions of the FDBM refrigerator appliance $R^4$ can use a hidden corner connecting piece $10^4$.

FIG. 9 is a front view of multiple adjacent cooling appliances utilizing the hidden injection molded plastic corner connecting pieces and horizontal and vertical extruded plastic profiles according to an exemplary embodiment consistent with present disclosure. For example, but not limited thereto, the multiple adjacent cooling appliances can include an FDBM refrigerator appliance as shown and described in FIGS. 8A and 8B in the middle, with a freezer column appliance on one side and a wine cooler appliance on the other side. Each of the multiple appliances can use the hidden corner connecting pieces 10 where hinges are not required and the horizontal extruded plastic profiles (20A, 20B; 20A', 20B'; 20A", 20B"; 20A''', 20B'''; $20A^4$, $20B^4$) and the vertical extruded plastic profiles (30A, 30B; 30A', 30B'; 30A", 30B"; 30A''', 30B'''; $30A^4$, $30B^4$). Preferably, the front frames FF1, FF2, and FF3 of each of the multiple adjacent cooling appliances should be one material all the way across, so that they are aesthetically pleasing when assembled as a group.

The present invention has substantial opportunity for variation without departing from the spirit or scope of the present invention. For example, while FIGS. 8A, 8B, and 9 show a French door-bottom mount (FDBM) style refrigerator, the present invention can be utilized in a side-by-side refrigerator where the refrigerator compartment and the freezer compartment are disposed side-by-side in a vertical orientation, as well as in other well-known refrigerator and cooling appliance configurations such as, but not limited to, top freezer configurations, bottom freezer configurations, and the like. Still further, the various features described in connection with a particular embodiment can be used (mixed and matched) with the other embodiments wherever appropriate.

Those skilled in the art will recognize improvements and modifications to the exemplary embodiments of the present invention. All such improvements and modifications are considered within the scope of the concepts disclosed herein and the claims that follow.

What is claimed is:

1. A refrigerator front frame for a refrigerator appliance, comprising:
    four extruded plastic profiles; and
    four corner connecting pieces configured to join the four extruded plastic profiles to form the refrigerator front frame,
    wherein at least one of a co-extruded or assembled, thin metal strip is embedded within a wall of each of the four extruded plastic profiles so as to be near an outer surface of a corresponding extruded plastic profile as compared to an overall wall thickness of the corresponding extruded plastic profile without being exposed from the outer surface of the corresponding extruded plastic profile,
    wherein a heating tube for distributing non-condensation heat is disposed to directly contact against an exposed rear side of the thin metal strip on a back side of the corresponding extruded plastic profile, and
    wherein the heating tube is retained by a clip and opposing extruded features that each project from the wall perpendicular to the thin metal strip and have hooks which hold the clip in place.

2. The refrigerator front frame of claim 1, wherein the thin metal strip has a thickness in a range of 0.4 mm to 1.0 mm.

3. The refrigerator front frame of claim 1, wherein the thin metal strip has a thickness of 0.5 mm.

4. The refrigerator front frame of claim 1, wherein the thin metal strip is spaced apart from the outer surface of the corresponding extruded plastic profile a distance in a range of 0.5 mm to 1.0 mm.

5. The refrigerator front frame of claim 1, wherein the thin metal strip is spaced apart from the outer surface of the corresponding extruded plastic profile a distance of 0.75 mm.

6. The refrigerator front frame of claim 1, wherein each of the four extruded plastic profiles comprises acrylonitrile butadiene styrene (ABS) plastic as a core plastic part and a co-extruded protective polymethylmethacrylate (PMMA) layer over the core plastic part.

7. The refrigerator front frame of claim 1, wherein each of the four extruded plastic profiles comprises an acrylonitrile styrene acrylate (ASA) plastic as a plastic part.

8. The refrigerator front frame of claim 1, wherein each of the four corner connecting pieces is an injection molded plastic part.

9. A method of forming each of the four extruded plastic profiles of the refrigerator front frame for a refrigerator appliance of claim 1, comprising the step of:
    co-extruding an acrylonitrile butadiene styrene (ABS) plastic as a core plastic part and a protective polymethylmethacrylate (PMMA) layer over the core plastic part.

10. A method of forming each of the four extruded plastic profiles of the refrigerator front frame for a refrigerator appliance of claim 1, comprising the step of:
    extruding an acrylonitrile styrene acrylate (ASA) plastic as a plastic part.

11. The refrigerator front frame of claim 1, wherein the refrigerator front frame having the four extruded plastic profiles and the four corner connecting pieces forms a front frame of a French door bottom mount (FDBM) refrigerator appliance.

12. The refrigerator front frame of claim 1, further comprising a plurality of the refrigerator front frames each having the four extruded plastic profiles and the four corner connecting pieces and each forming a corresponding front frame of one of multiple adjacent cooling appliances which are installed as a group.

13. The refrigerator front frame of claim 12, wherein the multiple adjacent cooling appliances include a French door bottom mount (FDBM) refrigerator appliance in a middle position, and a freezer column appliance on one side and a wine cooler appliance on the other side of the FDBM refrigerator appliance.

14. The refrigerator front frame of claim 1, wherein each of the four extruded plastic profiles is extruded in color and has a uniform, consistent appearance.

15. A refrigerator front frame for a refrigerator appliance, comprising:
    four extruded plastic profiles; and
    four corner connecting pieces configured to join the four extruded plastic profiles to form the refrigerator front frame,
    wherein at least one of a co-extruded or assembled, thin metal strip is embedded within a wall of each of the four extruded plastic profiles so as to be near an outer surface of a corresponding extruded plastic profile as compared to an overall wall thickness of the corresponding extruded plastic profile without being exposed from the outer surface of the corresponding extruded plastic profile,
    wherein a heating tube for distributing non-condensation heat is disposed to directly contact against an exposed rear side of the thin metal strip on a back side of the corresponding extruded plastic profile, and
    wherein a refrigerant with excess heat is passed through the heating tube to prevent condensation from forming at a front surface of the refrigerator front frame,
    wherein the heating tube is retained by a clip and opposing extruded features that each project from the wall perpendicular to the thin metal strip and have hooks which hold the clip in place.

* * * * *